Patented Oct. 28, 1952

2,615,898

UNITED STATES PATENT OFFICE 2,615,898

BENZOTHIOPHENE ANTHRAQUINONE DYESTUFFS

Fritz Max, Staten Island, N. Y., and Wilhelm Schmidt-Nickels, Little York, N. J., assignors to General Aniline & Film Corporation, New York, N. Y., a corporation of Delaware No Drawing. Application October 14, 1948,
Serial No. 54,582

12 Claims. (Cl. 260—329.2)

This invention relates to novel dyestuffs of the benzothiophene anthraquinone series.

More specifically, the invention relates to novel $a$-amino-benzothiophene anthraquinones which are valuable as dyestuffs for organic derivatives of cellulose, particularly cellulose esters and ethers such as cellulose acetate and ethyl cellulose and fibers or textile materials containing the same, such dyestuffs being applied to the aforesaid materials in the form of an aqueous dispersion. Further, the invention relates to $a$-aroylamino benzothiophene anthraquinones, corresponding to the aforesaid $a$-amino derivatives and prepared therefrom by reaction with an aryl carboxylating agent, which are valuable vat dyestuffs suitable for producing colorations on cellulosic fiber and textiles by conventional vat dyeing or printing procedures.

The novel dyestuffs of this invention are prepared from benzothiophene anthraquinones, advantageously obtained by the process of our copending application, Serial No. 53,148 filed October 6, 1948, now U. S. Patent 2,533,171, dated December 5, 1950, by condensation of phthalic anhydride with a dibenzothiophene (diphenylene sulfide) and ring closure of the resulting ortho-2-dibenzothenoyl benzoic acid in the presence of a mixture of ortho-phosphoric acid and phosphorus pentoxide. Since the initial condensation of dibenzothiophene with phthalic anhydride results in substitution of one of the benzene rings of the dibenzothiophene nucleus in para-position to the sulfur (i. e., the 2-position), the sulfur occupies a beta-position of the anthraquinone nucleus in the resulting benzothiophene anthraquinone, and the anthraquinone nucleus retains at least three unsubstituted alpha-positions. Thus, the benzothiophene anthraquinones are believed to be a mixture of two compounds having the following nuclear structures:

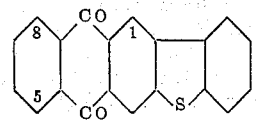

and

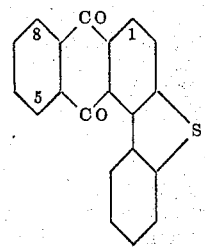

wherein the first compound has four unsubstituted alpha-positions in the anthraquinone nucleus and the second compound has three unsubstituted alpha-positions.

In preparing the novel dyestuffs suitable for coloring cellulose esters and ethers in accordance with this invention, the aforesaid benzothiophene anthraquinones are subjected to nitration by treatment with a mixture of concentrated nitric and sulfuric acids. An $a$-dinitro benzothiophene anthraquinone is thereby formed wherein the $a$-nitro groups apparently occupy the 1,5- and 1,8-positions of the anthraquinone nucleus. The $a$-dinitro compounds are thereupon subjected to reduction, for example, by heating with an aqueous alkali metal sulfide solution, yielding the corresponding diamino-benzothiophene anthraquinones.

Additional amino groups can be introduced into the remaining unsubstituted alpha-positions of the anthraquinone nucleus by acylating the aforesaid $a$-diamino compounds, with oxalic acid, to form the corresponding dioxaminic acid, subjecting this compound to nitration with concentrated sulfuric acid and nitric acid, reducing the additional nitro groups thereby introduced to amino groups by reaction with alkali metal sulfide and reconverting the oxaminic acid groups to amino groups by alkaline hydrolysis.

The $a$-polyamino-benzothiophene anthraquinones of this invention, produced as indicated above, are water-soluble compounds which can be dispersed in aqueous media with a suitable dispersing agent to yield dye baths from which organic derivatives, particularly ethers and esters, of cellulose, e. g., cellulose acetate, cellulose butyrate, ethyl cellulose, cellulose acetate butyrate, in the form of a fiber or textile material containing the same, can be dyed in brilliant orange to scarlet to blue shades of outstanding fastness properties.

The vat dyestuffs of this invention are the poly-$a$-aroylamino-benzothiophene anthraquinones corresponding to the aforesaid poly-$a$-amino compounds. They are conveniently produced by reacting the poly-$a$-amino benzothiophene anthraquinones of the invention with an aryl carboxy acid halide such as benzoyl chloride, 2-methoxy-3-naphthoyl chloride, 1-aminoanthraquinone-2-carboxy acid chloride, or the corresponding bromides or anhydrides, in an organic solvent such as nitrobenzene in the presence of a basic compound such as an alkali metal carbonate. The resulting poly-$a$-aroylamino benzothiophene anthraquinones can be applied to cellulosic fiber such as cotton or regenerated cellulose or textile materials containing the same, from an alkaline hydrosulfite vat or printed thereon in the form of a vat printing composition. Upon subsequent aging to effect reoxidation on the fiber, strong yellow shades of excellent fastness properties are produced.

The invention is illustrated by the following examples wherein the parts and percentages are by weight and the temperatures are in degrees centigrade.

*Example 1*

47.1 parts of benzothiophene anthraquinone prepared by condensing phthalic anhydride with dibenzothiophene in the presence of aluminum chloride, and heating the resulting ortho-2-dibenzothenoyl benzoic acid with an equimolecular mixture of ortho-phosphoric acid and phosphorus pentoxide at 170° for 10 minutes, were introduced at a temperature below 40° into an agitated mixture of 150 parts of concentrated sulfuric acid and 171 parts of a mixture of nitric acid and concentrated sulfuric acid in a ratio of 1:2. When the addition is complete, the mixture is agitated at 40° for 1 hour, then cooled to 20° and poured into ice water. Alpha-dinitro-benzothiophene anthraquinone is thereby precipitated, and recovered in the form of a filter cake by filtration. The filter cake is washed with water and introduced into a solution, heated to 95°, made by adding 180 parts of crystalline sodium sulfide ($Na_2S.9H_2O$) and 110 parts of 20% aqueous sodium hydroxide solution to 875 parts of water. The resulting mixture is stirred at 95–100° for one-half hour to effect complete reduction of the nitro groups to amino groups. The resulting $\alpha$-diamino-benzothiophene anthraquinone is recovered by filtration in the form of a filter cake, washed with water until neutral and dried.

To prepare a dye bath from the resulting $\alpha$-diamino compound, 0.6 part thereof can be dissolved in a small quantity of a mixture of equal parts of alcohol and acetone, followed by admixture of 40 parts of a 50% aqueous solution of N,N-oleyl methyl taurine sodium salt or of a similar saponaceous dispersing agent, and diluting the mixture with 5000 parts of warm water at 45–55°. 100 parts of cellulose acetate silk in the form of yarn or fabric, is then worked into the dye bath while raising the temperature to 80–90°. When the dyeing is complete, the dyed material is removed from the dye bath, soaped, rinsed and dried. A brilliant scarlet shade of good fastness properties is produced on the fiber or textile material.

Instead of unsubstituted benzothiophene anthraquinone employed in the foregoing example, substituted benzothiophene anthraquinones can be used as starting materials containing, for example, chlorine, bromine or a nitro group in the benzene ring of the benzothiophene nucleus in para-position to the sulfur, obtained by ring closure of 8-chloro-, 8-bromo or 8-nitro-ortho-2-dibenzothenoyl benzoic acid. The mono-halobenzothiophene anthraquinones yield the corresponding halo-$\alpha$-polyamino-benzothiophene anthraquinones upon nitration and reduction as disclosed in the foregoing example, while the product obtained from the aforesaid nitro-benzothiophene anthraquinone yields an $\alpha$-diamino-benzothiophene anthraquinone having a third amino group in the benzene ring of the benzothiophene nucleus, resulting from reduction of the nitro group originally present therein. The resulting polyamino compounds likewise yield brilliant scarlet to orange shades on organic derivatives of cellulose when applied thereto from aqueous dispersions.

*Example 2*

The $\alpha$-diamino-benzothiophene anthraquinone of Example 1 is converted to the corresponding $\alpha$-dioxaminic acid by heating it with four times its weight of oxalic acid at a temperature of 100–150° until the unreacted diamino compound is no longer present. Excess oxalic acid is removed from the reaction mixture by extraction with water, and the residue is dried and subjected to nitration with a mixture of concentrated sulfuric acid and nitric acid by the same procedure as that described in Example 1. The nitrated product is recovered by drowning the mixture in ice water. The oxaminic acid groups are reconverted to amino groups by heating with dilute aqueous caustic soda solution, and the nitro groups of the resulting nitrated $\alpha$-diamino-benzothiophene anthraquinone are reduced to amino groups by heating with aqueous sodium sulfide as described in Example 1. The resulting insoluble $\alpha$-polyamino-benzothiophene anthraquinone is recovered from the reaction mixture by filtration, washed with water and dried. The resulting compound contains amino groups in each of the $\alpha$-positions of the anthraquinone nucleus available for substitution in the original benzothiophene anthraquinone.

The resulting $\alpha$-polyamino-benzothiophene anthraquinone can be dispersed in an aqueous dye bath as disclosed in the preceding example and applied in dyeing cellulose acetate fiber, whereby reddish-blue colorations of good fastness properties can be obtained.

By employing substituted $\alpha$-diamino-benzothiophene anthraquinones of the preceding example, correspondingly substituted $\alpha$-polyamino-benzothiophene anthraquinones are obtained in the process of this example.

*Example 3*

9.8 parts of the $\alpha$-diamino-benzothiophene anthraquinone of Example 1 are mixed with 120 parts of nitrobenzene containing 12.2 parts of benzoyl chloride, and 9.1 parts of sodium carbonate are added thereto. The mixture is heated while agitating at a temperature of 200–205° for 5 hours. The reaction mixture is then allowed to cool and the benzoylated product which separates from the mixture is recovered by filtration, washed with nitrobenzene and dried. For purification the resulting product is dissolved in concentrated sulfuric acid, drowned in dilute aqueous alkali metal bichromate, the resulting slurry boiled for a short time and the insoluble product recovered by filtration. The product is then boiled with a dilute alkaline sodium hypochlorite solution, separated by filtration, washed and dried. Alpha - dibenzoylamino-benzothiophene anthraquinone is thereby obtained in sufficient purity and in satisfactory form for use as a vat dyestuff.

The compound dissolves in an alkaline hydrosulfite vat to yield a dye bath which dyes cotton in strong orange yellow shades of excellent fastness properties, after subsequent aging to oxidize the dyestuff on the fiber.

Similar benzoylation of the $\alpha$-polyamino-benzothiophene anthraquinone of Example 2 and of the corresponding substituted diamino- and polyamino-benzothiophene anthraquinones containing chlorine, bromine or an additional amino group in the benzene ring of the benzothiophene nucleus, described in Examples 1 and 2, likewise yields vat dyestuffs suitable for producing shades of similar brilliance and fastness properties on cellulosic materials by the aforesaid vat dyeing procedure. Similarly, the vat dyestuffs of the invention can be incorporated in vat printing compositions and applied in this form to produce colorations of equal quality on cellulosic materials.

Instead of benzoyl chloride, other aromatic carboxylic acid chlorides, bromides or anhydrides can be employed in the aroylation reaction of the preceding example. Thus, 2-methoxy-3-naphthoyl chloride, anthraquinone-2-carboxylic acid chloride, 1 - amino - anthraquinone-2-carboxylic acid chloride, or the corresponding bromides or anhydrides can be used to form vat dyes from the amino compounds of Examples 1 and 2 in the manner disclosed in Example 3.

While the structure of the dyestuffs produced in accordance with this invention have not been demonstrated, they are apparently mixtures of compounds having the benzothiophene anthraquinone structures set out above, wherein the sulfur of the benzothiophene nucleus occupies a beta-position of the anthraquinone nucleus. Nitro groups introduced by nitration and the corresponding amino groups introduced as disclosed in Example 1, and the corresponding aroyalamino groups formed as disclosed in Example 3 apparently occupy the 1,5- and 1,8-positions of the anthraquinone nucleus in the aforesaid nuclear structures; while the additional nitro, amino and aroylamino groups introduced as disclosed in Examples 2 and 3 occupy the remaining α-positions of the anthraquinone nucleus in the aforesaid structures. Substituents initially present in the ortho-2-dibenzothenoyl benzoic acid from which the dibenzothiophene anthraquinones are formed occupy a position para to the sulfur atom in the benzene ring of the benzothiophene nucleus.

Variations and modifications which are obvious to those skilled in the art can be made in the foregoing processes and products without departing from the scope of the invention.

We claim:

1. As a new product, suitable for producing colorations on organic derivatives of cellulose, an α - polyamino - benzothiophene anthraquinone compound, wherein the sulfur of the benzothiophene nucleus occupies a beta-position of the anthraquinone nucleus.

2. As a new product, suitable for producing colorations on organic derivatives of cellulose, an α-diamino-benzothiophene anthraquinone compound, wherein the sulfur of the benzothiophene nucleus occupies a beta-position of the anthraquinone nucleus.

3. As a new product, suitable for producing colorations on organic derivatives of cellulose, α-diamino-benzothiophene anthraquinone.

4. As a new product, suitable for producing colorations on cellulosic materials by vat dyeing procedures, an α-polyaroylamino benzothiophene anthraquinone, wherein the sulfur of the benzothiophene nucleus occupies a beta-position of the anthraquinone nucleus.

5. As a new product, suitable for producing colorations on cellulosic materials by vat dyeing procedures, an α-diaroylamino benzothiophene anthraquinone, wherein the sulfur of the benzothiophene nucleus occupies a beta-position of the anthraquinone nucleus.

6. As a new product, α-dibenzoylamino benzothiophene anthraquinone.

7. The process for preparing dyestuffs suitable for coloration of organic derivatives of cellulose, which comprises nitrating a benzothiophene anthraquinone, wherein the sulfur occupies a beta-position of the anthraquinone nucleus and at least three alpha-positions of the anthraquinone nucleus are unoccupied, and reducing the nitro groups in the resulting compound to amino groups.

8. The process for preparing dyestuffs suitable for coloration of organic derivatives of cellulose, which comprises nitrating a benzothiophene anthraquinone, wherein the sulfur occupies a beta-position of the anthraquinone nucleus and at least three alpha-positions of the anthraquinone nucleus are unoccupied, reducing the nitro groups to amino groups, converting the amino groups to oxaminic acid groups, nitrating the resulting polyoxaminic acid compound, reducing the nitro groups formed by nitration to amino groups, and saponifying the oxaminic acid groups to amino groups.

9. The process for preparing a dyestuff suitable for coloration of organic derivatives of cellulose which comprises dinitrating benzothiophene anthraquinone, wherein the sulfur occupies a beta-position of the anthraquinone nucleus, and reducing the resulting α-dinitrobenzothiophene anthraquinone to the corresponding α-diamino compound.

10. The process for preparing a vat dyestuff which comprises acylating the free amino groups of a dyestuff prepared according to claim 7, with an aryl carboxylating agent.

11. The process for preparing a vat dyestuff which comprises aroylating the final polyamino dyestuff of claim 8, with an aryl carboxylating agent.

12. The process for preparing a vat dyestuff which comprises reacting the dyestuff prepared according to claim 9 with a benzoylating agent.

FRITZ MAX.
WILHELM SCHMIDT-NICKELS.

REFERENCES CITED

The following references are of record in the file of this patent:

UNITED STATES PATENTS

| Number | Name | Date |
|---|---|---|
| 2,281,583 | Kranzlein | May 5, 1942 |

OTHER REFERENCES

Georgievics: Textbook of Dye Chemistry, pp. 56 and 57, Scott, Greenwood and Son, London, 1920.

J. Org. Chem. 3, 119 (1938).